(12) United States Patent
Pekal

(10) Patent No.: US 12,552,063 B2
(45) Date of Patent: Feb. 17, 2026

(54) CUTTING BLADE MOUNTING DEVICE, CUTTING DEVICE AS WELL AS MAGAZINE FOR A CUTTING BLADE

(71) Applicant: FRIMO GROUP GMBH, Lotte (DE)

(72) Inventor: Christoph Pekal, Osnabrück (DE)

(73) Assignee: FRIMO GROUP GMBH, Lotte (DE)

( * ) Notice: Subject to any disclaimer, the term of this patent is extended or adjusted under 35 U.S.C. 154(b) by 459 days.

(21) Appl. No.: 17/370,139

(22) Filed: Jul. 8, 2021

(65) Prior Publication Data

US 2022/0009117 A1 Jan. 13, 2022

(30) Foreign Application Priority Data

Jul. 8, 2020 (DE) .......................... 102020208558.7

(51) Int. Cl.
*B26D 7/26* (2006.01)
*B26D 7/08* (2006.01)

(52) U.S. Cl.
CPC ........... *B26D 7/2614* (2013.01); *B26D 7/086* (2013.01)

(58) Field of Classification Search
CPC ................ B26D 7/2614; B26D 7/086; B23Q 2003/15527
USPC ...... 483/1, 58–68, 16–57; 83/956, 481, 954, 83/750, 408
See application file for complete search history.

(56) References Cited

U.S. PATENT DOCUMENTS

| 4,493,460 | A | * | 1/1985 | Buss ...................... | B65H 19/10 242/594.6 |
| 4,596,171 | A | * | 6/1986 | Gerber .................. | B26D 7/086 83/749 |
| 5,964,136 | A | * | 10/1999 | Bittner .................. | B23D 19/04 83/482 |
| 2002/0000144 | A1 | * | 1/2002 | Shinga ..................... | B41J 15/04 83/72 |
| 2009/0127145 | A1 | | 5/2009 | Nonaka et al. | |
| 2010/0043610 | A1 | | 2/2010 | Tanaka | |
| 2013/0112668 | A1 | * | 5/2013 | Tweitmann ........ | B23K 26/1482 219/121.6 |
| 2017/0361410 | A1 | * | 12/2017 | Sato ........................ | A61C 13/00 |
| 2020/0246925 | A1 | | 8/2020 | Rempfler et al. | |
| 2020/0246926 | A1 | | 8/2020 | Rempfler et al. | |

FOREIGN PATENT DOCUMENTS

| CN | 104128625 A | 11/2014 |
| CN | 110027023 A | 7/2019 |
| DE | 32 34 057 A1 | 3/1984 |

(Continued)

OTHER PUBLICATIONS

Search Report for German Application No. 10 2020 208 558.7, dated May 26, 2021.

(Continued)

*Primary Examiner* — Sean M Michalski
*Assistant Examiner* — Robert D Cornett
(74) *Attorney, Agent, or Firm* — Wolf, Greenfield & Sacks, P.C.

(57) ABSTRACT

The invention relates to a cutting blade mounting device comprising a cutting blade comprising a shank, and an attachment member which receives at least sections of the shank of the cutting blade. The attachment member comprises a structure, in particular a thread, for attachment to a cutting blade holder of a cutting device.

6 Claims, 5 Drawing Sheets

(56) References Cited

FOREIGN PATENT DOCUMENTS

| | | |
|---|---|---|
| DE | 35 29 686 A1 | 2/1987 |
| DE | 196 15 218 A1 | 10/1997 |
| DE | 297 19 746 U1 | 3/1999 |
| DE | 102 55 270 A1 | 6/2004 |
| DE | 103 12 445 A1 | 10/2004 |
| DE | 699 14 465 T2 | 11/2004 |
| DE | 698 29 043 T2 | 2/2006 |
| DE | 10 2011 075 137 A1 | 11/2012 |
| DE | 20 2018 106 757 U1 | 2/2019 |
| DE | 10 2017 223 182 A1 | 6/2019 |
| EP | 1 932 636 B1 | 6/2008 |
| EP | 2 347 870 A1 | 7/2011 |
| EP | 3 689 537 A1 | 8/2020 |
| EP | 3 689 564 A1 | 8/2020 |
| GB | 2 443 538 A | 5/2008 |
| KR | 10-2015-0081653 A | 7/2015 |
| WO | WO 2008/156116 A1 | 12/2008 |

OTHER PUBLICATIONS

Extended European Search Report dated Dec. 2, 2021 in connection with European Application No. 21183982.4, and English translation thereof.

* cited by examiner

CUTTING BLADE MOUNTING DEVICE, CUTTING DEVICE AS WELL AS MAGAZINE FOR A CUTTING BLADE

RELATED APPLICATIONS

This Application claims priority to German application number DE 10 2020 208558.7, filed Jul. 8, 2020, which is herein incorporated by reference in its entirety.

TECHNICAL FIELD

The invention relates to a cutting blade mounting device, a cutting device, in particular an ultrasonic cutting device, as well as a magazine for a cutting blade. A method for changing a cutting blade is furthermore provided.

PRIOR ART

Ultrasonic cutting devices are known in the prior art, which are used for cutting artificial or natural leather, for example.

Known, for instance, is EP 2 347 870 A1 which discloses a device for producing a tear line in the rear side of a cover material, said cover material preferably consisting at least in sections of plastic, in particular in the rear side of an interior trim material for vehicles. The device comprises a support by means of which the cover material can be supported and a tool mounted at a distance thereabove which can be moved back and forth by a motor in the direction of the support and which can penetrate into the rear side of the cover material and be moved forwards following the path of the desired tear line. The device is characterised in that the tool is formed by a chisel, the back and forth movement of which is effected at a frequency of 16 to 70 kHz, preferably 18 to 40 kHz.

A back and forth movement of a cutting blade in an ultrasonic cutting device is effected therein by means of a sonotrode. Due to the high frequency during the cutting process, the cutting blade is exposed to correspondingly high acceleration forces.

Experience has shown that due to the aforementioned load on the cutting blade, measures are required that prevent the cutting blade from being welded to a cutting blade holder of a cutting device by the oscillating forces during a cutting process. It is known, for example, in this regard to apply a copper paste to the cutting blade or cutting blade holder, which forms a layer between the cutting blade and the cutting blade holder and thus prevents these two elements from being welded together.

However, this approach has the disadvantage that a relatively high amount of effort is required to change a cutting blade. To do so, an operator must apply the copper paste to the cutting blade or cutting blade holder when changing a cutting blade so that the copper paste can form a layer between the cutting blade and the cutting blade holder.

This leads to relatively high downtimes of a plant with such a cutting device. In addition, there is always a risk of injury to the operator if the cutting blade is changed manually.

Furthermore, the changing of cutting blades always constitutes a source of error that leads to a subsequently reduced cut quality on the product, for example if the cutting blade is inserted and secured in the cutting blade holder at an incorrect angular orientation. In addition to a reduced cut quality, this can also lead to breakage of the cutting blade or destruction of the product to be manufactured. Furthermore, if the wrong tightening torque is used to secure the cutting blade, the user can cause welding with the cutting blade holder or destroy the interface between the blade and sonotrode.

SUBJECT MATTER OF THE INVENTION

The object of the invention is to at least partially solve the aforementioned problems and to facilitate the change of a cutting blade.

For this purpose, the invention provides a cutting blade mounting device according to claim 1. The invention is furthermore directed at a cutting device, a magazine for a cutting blade, and a method for changing a cutting blade. Preferred embodiments are specified in the dependent claims. Features of the dependent claims regarding the cutting blade mounting device can also be used in the cutting device, the magazine for the cutting blade and/or the method. The same applies to the dependent claims regarding the cutting device, the magazine for a cutting blade and the method.

According to the invention, the cutting blade mounting device comprises a cutting blade with a shank, as well as an attachment member that receives at least sections of the shank of the cutting blade. The attachment member furthermore comprises a structure for attachment to a cutting blade holder of a cutting device.

Said structure for attachment to a cutting blade holder of a cutting device may be a thread. According to further embodiments, the structure may be a projection or recess, with which a cutting blade holder of a cutting device may engage.

The cutting blade mounting device has the advantage that it is possible to repeatedly provide the correct alignment of the cutting blade on the cutting blade holder. It is therefore possible to safely and reliably change a cutting blade. A specific tightening torque for connecting the cutting blade to the cutting blade holder of a cutting device can furthermore be monitored and adhered to in a repeatable manner. The installation length of the cutting blade can also be monitored.

The cutting blade mounting device furthermore enables a blade to be changed without interrupting the manufacturing or cutting process. In this manner, the cycle time of the blade change can be shortened as compared to a manual change and can be performed within a defined time window.

An evaluation of the quality of the blade can also be carried out. For this purpose, it is provided according to a preferred embodiment that the cutting blade mounting device comprises a device for detecting and/or evaluating the quality of the cutting blade.

The magazine can accommodate one cutting blade or a plurality of cutting blades. Owing to the fact that the change of the cutting blade is carried out by receiving of the cutting blade from the magazine, possible errors occurring during the manual mounting of a cutting blade can be avoided. If a magazine accommodates a plurality of cutting blades, different blade geometries can be held ready and can be swapped into a cutting device as required. The flexibility of a plant/machine with such a cutting device is therefore significantly increased.

In one embodiment, it is provided that the attachment member comprises an engagement structure, with which a transmission member/drive member can engage to cause the attachment member to rotate. The attachment member can therefore be fixed by means of a rotational movement.

The engagement structure is preferably configured in the form of a toothed wheel so that a secure and defined transmission of force is ensured.

In a further embodiment, the cutting blade comprises a projection, in particular a circumferential projection, which abuts an inner side of the attachment member. The projection of the cutting blade may abut against an inner portion of the attachment member.

It is preferred that said structure, which is configured as a thread in a preferred embodiment, is more preferably an internal thread. A secure attachment can thus be ensured and a change of blade can be performed within a defined time window.

In a further embodiment, it is provided that the attachment member is rotatable relative to the cutting blade such that attachment of the cutting blade is enabled by means of a relatively simple construction.

The invention furthermore relates to a cutting device that is configured, for example, as an ultrasonic cutting device. The cutting device comprises: a drive for generating an oscillating motion and a cutting blade holder comprising a cutting blade receptacle for receiving a cutting blade. The cutting blade receptacle is configured in such a manner that the drive can drive the cutting blade. It is furthermore provided that the cutting blade holder comprises a structure, in particular a thread, to which an attachment member that receives a cutting blade can be mounted for attachment.

Said structure may be a thread, as already explained above. According to further embodiments, the structure may be a projection or a recess.

The cutting device enables a blade to be changed without interrupting the manufacturing or cutting process. The cycle time of the blade change can thus be shortened as compared to a manual change and can be performed within a defined time window. An evaluation of the quality of the blade can also be carried out.

The structure, in particular thread, of the cutting blade holder may be an external thread.

In one embodiment, it is provided that an abutment portion will be or is provided at an outermost portion of the cutting blade holder, which abutment portion serves or is configured as a stop for a projection of the cutting blade.

A magazine for one or more cutting blades is furthermore provided, said magazine comprising: a cutting blade support configured to receive an attachment member for a cutting blade, a drive member configured to effect attachment of the attachment member to a cutting device. Attachment can be effected in particular by means of a rotational movement of the attachment member, driven by the drive member.

A quick blade change is ensured with such a magazine. As regards further advantages, reference is made to the explanations provided above with regard to the cutting blade mounting device and the cutting device.

In one embodiment, it is provided that the magazine comprises a device for detecting and/or evaluating the quality of the cutting blade.

The magazine may be configured such that the cutting blade support comprises a first component and a second component that are movable relative to one another, the engaging element engaging with the first component to move the first component of the cutting blade support in an axial direction.

The drive member for transmitting a rotational movement to the attachment member is preferably configured as a toothed wheel.

It is furthermore preferred that a drive member and a shaft are provided, which are connected to one another. The drive member may be attached to the shaft. The shaft may furthermore extend in a direction parallel to the axial direction.

A counter bearing may be provided on the magazine, which is arranged such that the attachment member is accommodated between the counter bearing and the drive member.

A secure transmission of force can be ensured in this manner. The attachment member is also held securely during a blade change.

A method for changing a cutting blade is furthermore provided. A cutting device or magazine according to any of the aforementioned aspects may be used in the method.

In the course of the method, a cutting device, in particular an ultrasonic cutting device, is aligned relative to a magazine so that a cutting blade can be received by a cutting blade holder of the cutting device. The method furthermore comprises the step of attaching the cutting blade to a cutting blade holder of the cutting device by means of a driven attachment member.

By means of the cited method, a cutting blade can be quickly changed without interrupting the manufacturing or cutting process. In this manner, the cycle time of the blade change can be shortened as compared to a manual change and can be performed within a defined time window. An evaluation of the quality of the blade can also be carried out.

It is preferred that the attachment member is caused to rotate in order to attach the cutting blade. This rotational movement is performed until the cutting blade has been attached. In the course hereof, the cutting blade is attached to the cutting device in a defined orientation.

It is preferred that a change of blade is performed in the course of the method. In particular, prior to attaching the cutting blade, a cutting blade that is already attached to the cutting device is removed and accommodated in the magazine.

BRIEF DESCRIPTION OF THE DRAWINGS

Further features and advantages of the invention are apparent from the following description of a preferred embodiment.

DETAILED DESCRIPTION OF THE PREFERRED EMBODIMENT

Figure 1:
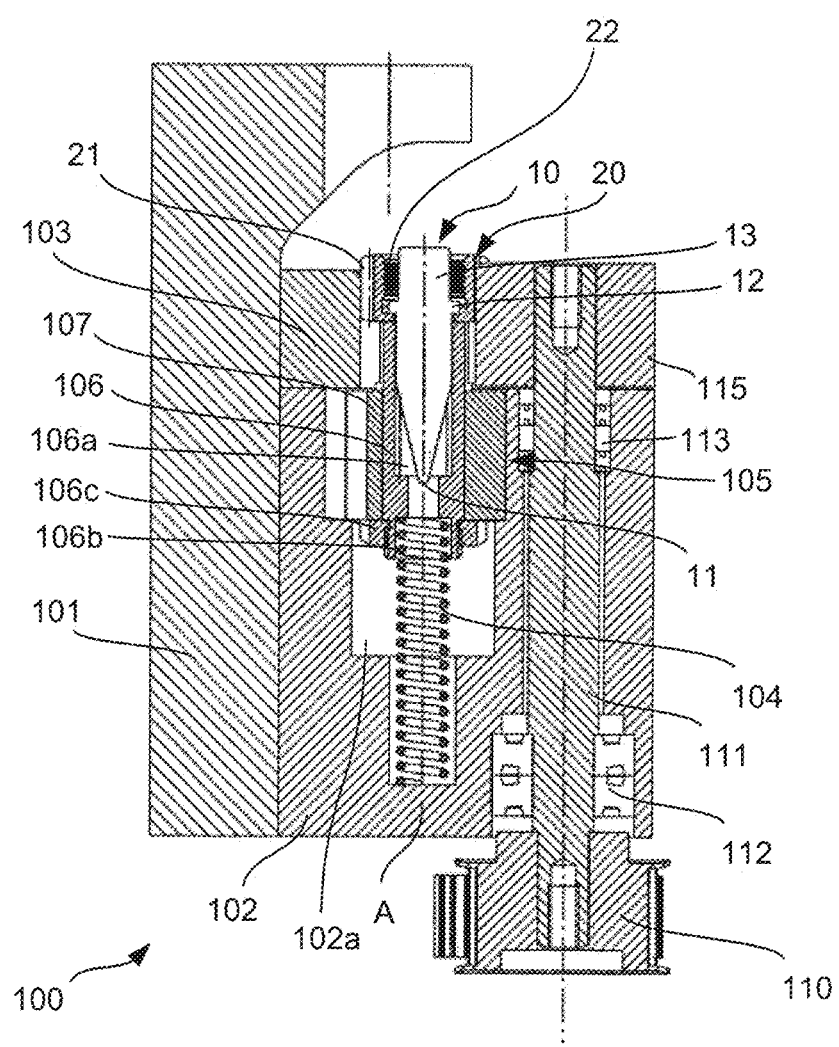
FIG. 1 shows a sectional view of a magazine for a cutting blade as well as a cutting blade mounting device accommodated therein which has a cutting blade.
Figure 2:
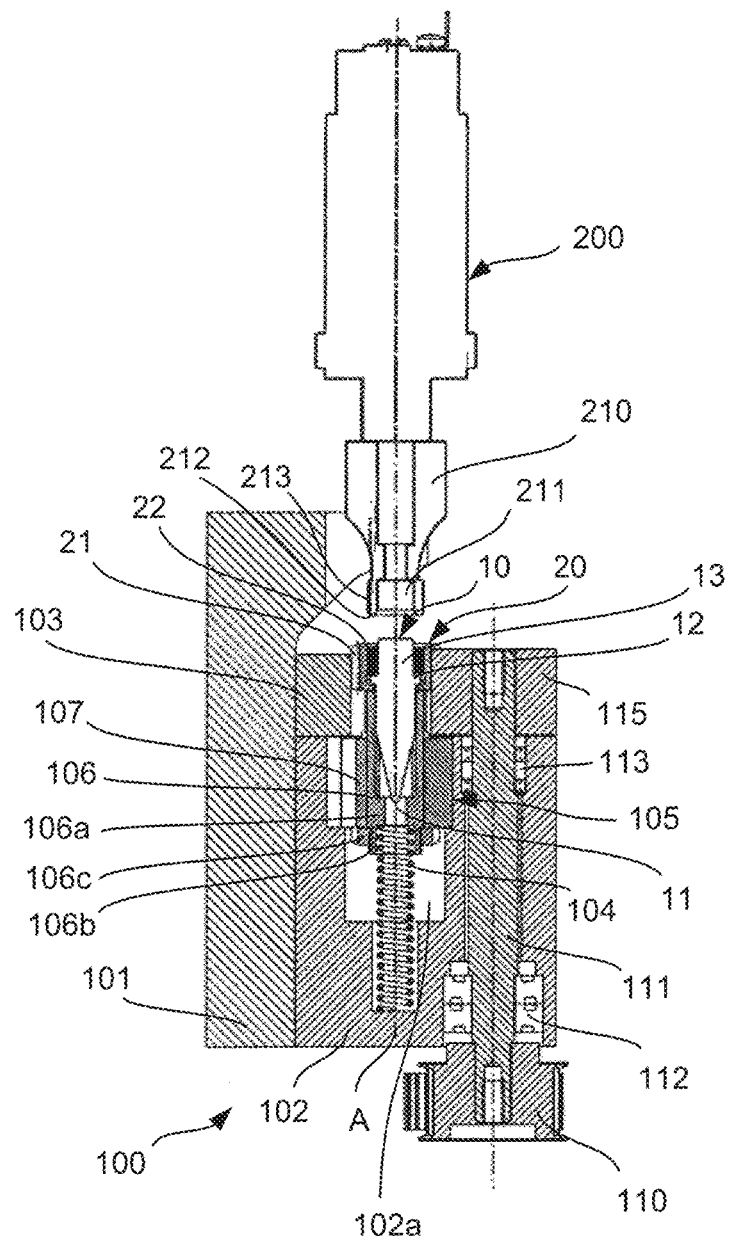
FIG. 2 shows the arrangement according to FIG. 1, in which a cutting device for receiving the cutting blade is advanced.
Figure 3:
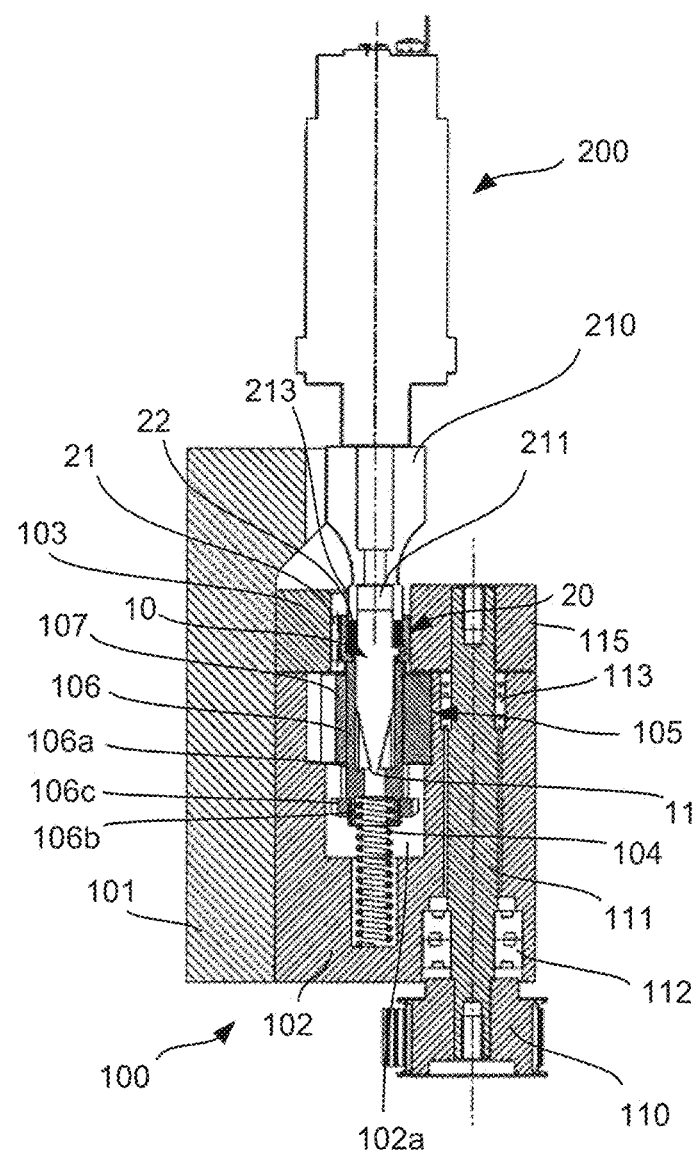
FIG. 3 shows the cutting device shown in FIG. 2 during receiving of the cutting blade.
Figure 4:
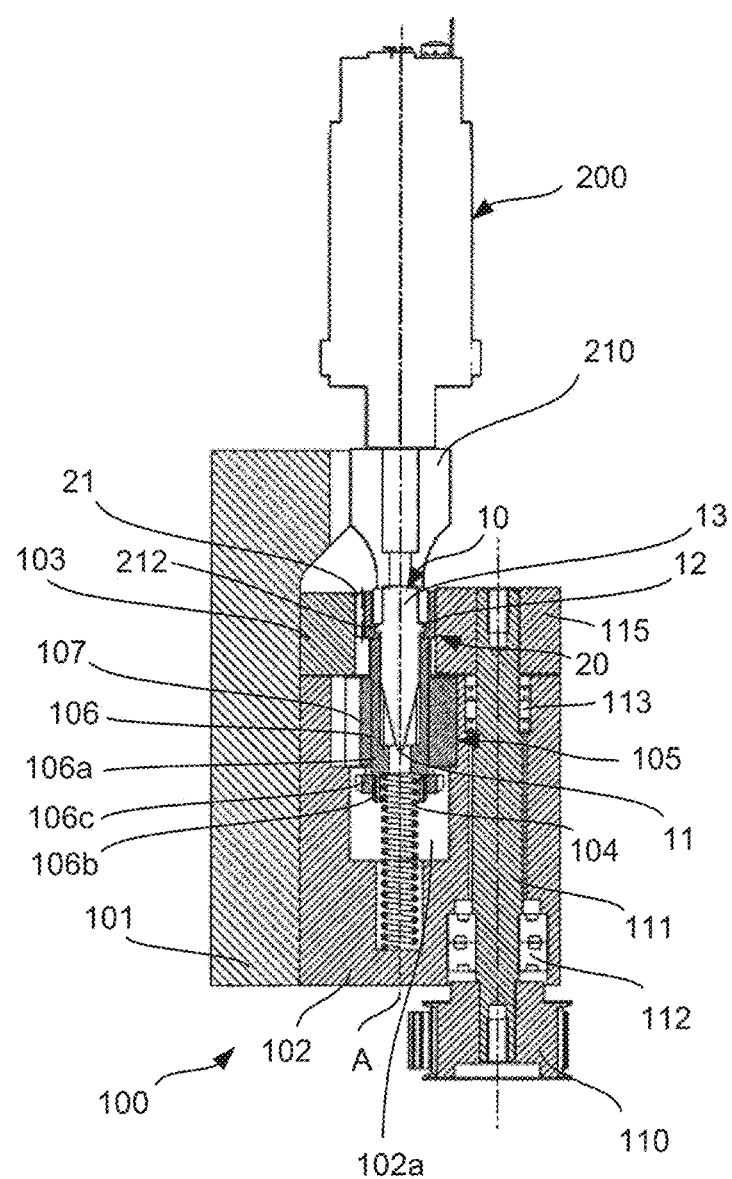
FIG. 4 shows a state in which the cutting blade is guided out of the magazine.
Figure 5:
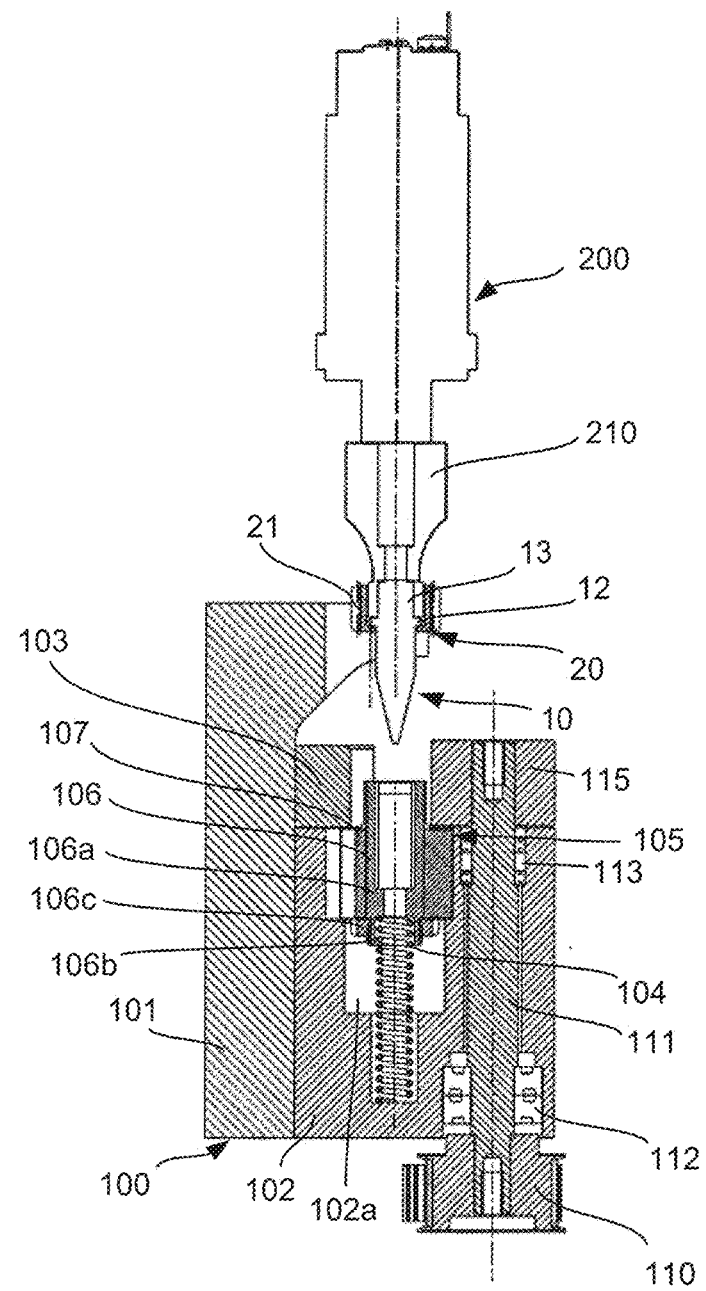
FIG. 5 shows a situation in which the cutting blade is removed from the magazine.

An embodiment will be described below by means of the enclosed figures. Further modifications of individual features that are cited in this regard can each be combined with one another to form further embodiments of the invention. Even though the described embodiment is to be understood purely as an example, and not in a restrictive manner, individual features of the described embodiment can be used to render the invention more specific.

In the embodiment described below, a cutting blade 10 is accommodated in a magazine 100. Even though the magazine 100 according to the embodiment only accommodates a single cutting blade 10, the magazine 100 can be expanded as desired and thus accommodate a plurality of cutting blades.

Such a cutting blade 10 is used, for example, for a separating process for numerous materials, or to introduce lines of weakness into a material. This may in particular be a line of weakness in a synthetic leather material used to trim an interior component of a passenger car.

The cutting blade 10 comprises a tip 11 that penetrates into the material to be cut and a shank 13 that is received in a cutting blade holder (described below). A projection 12 is provided between the tip 11 and the shank 13, which, as explained below, comes into contact with an abutment portion of a cutting blade holder.

The cutting blade 10 is accommodated in an attachment member 20 that extends at least in sections around the shank 13 in the cutting blade 10. The projection 12 of the cutting blade 10 thereby abuts an inner portion of the attachment member 20.

The attachment member 20 comprises an outer engagement structure 21 formed on an outer circumferential side of the attachment member 20 similar to, for example, a toothed wheel, as well as an internal thread 22 that is opposite the shank 13 of the cutting blade 10 at a predetermined distance. Even though an attachment member in the form of a toothed wheel is described in the context of the present embodiment, the attachment member may also be configured, for example, in a hexagonal shape or the like.

The attachment member 20 together with the cutting blade 10 is accommodated in a magazine 100. The magazine 100 comprises a housing 101 and a base 102. The base 102 forms an internal recess 102a, in which a spring 104 extends. The direction of extension of the spring 104 is also referred to as the axial direction A.

A cutting blade support 105 is furthermore accommodated in the internal recess 102a and is in contact with the spring 104. The cutting blade support 105 may be in the form of a splined hub to be able to transmit torque in an advantageous manner.

The cutting blade support 105 is formed in multiple parts. An inner component 106 is provided in the centre, which is accommodated in an outer component 107. The inner component 106 is movable relative to the outer component 107 along the axial direction.

The inner component 106 comprises a recess 106a in which sections of the cutting blade 10 are received, as well as a receiving portion 106b in which the spring 104 is inserted at least in sections. A stop 106c is furthermore provided, which limits the axial movement of the inner component 106 relative to the outer component 107. The inner component 106 may be in the form of a spline shaft to be able to receive torque in an advantageous manner.

The magazine 100 furthermore comprises a counter bearing 103 that is opposite a drive member (for example a toothed wheel) 115. The attachment member 20 with the blade 10 is accommodated between the counter bearing 103 and the drive member 115.

The magazine 100 comprises a drive for actuating the attachment member 20. The drive comprises a drive member 110, which is configured in the embodiment example as a drive pulley that can be driven by a belt. In other embodiments, the drive member 110 may also be configured as a toothed wheel or the like.

The drive member 110 is attached to a shaft 111 that extends parallel to the axial direction A. The shaft 111 is rotatably supported on the base 102 by a first bearing 112 and a second bearing 113.

Drive member 115 is provided at an end of the shaft 111 opposite the drive member 110 and comprises an engagement structure (toothed wheel) that engages with the outer engagement structure 21 of attachment member 20. If the drive member 115 is rotated, the attachment member 20 is thus also caused to rotate.

The cutting blade 10 is intended to be received in a cutting device 200. For this purpose, the cutting device 200 comprises a cutting blade holder 210 that comprises a cutting blade receptacle 211. An abutment portion 212 is provided at an outermost portion of the cutting blade holder 210.

A back and forth movement (oscillating motion) of the cutting blade 10 during a cutting operation is caused by means of a sonotrode/booster (or another type of oscillation) accommodated in the cutting device 200. The cutting blade is hereby in particular caused to oscillate in the range of 20 to 50 kHz.

A method for removing the cutting blade 10 from the magazine 100 will be described below.

The cutting blade 10, which is inserted in the attachment member 20, is initially located in a storage position. For example, an operator may insert the cutting blade 10 together with the attachment member 20 into the magazine 100 and thus hold it ready for transfer to a cutting device 200.

The cutting device 200 is then guided into the region of the magazine 100. The cutting device 200 may be attached to a robotic arm (not shown in the figures) that moves the cutting device 200 into the region of the magazine 100 for a blade change. For this purpose, the cutting device 200 is aligned with the axial direction A.

The cutting device 200 is now guided in the direction of the cutting blade 10 such that the shank 13 of the cutting blade 10 partially enters the cutting blade receptacle 211. The drive member 115 is subsequently caused to rotate such that, owing to the engagement of the drive member 115 with the attachment member 20, the attachment member 20 is rotated about the axial direction (axis) A.

In this manner, the external thread of the cutting blade holder 211 is inserted into the internal thread 22 of the attachment member 20 until the abutment portion 212 is brought into abutment with the projection 12 of the cutting blade 10. The counter bearing 103 ensures that the attachment member 20 is driven in a rotational movement, but thereby remains in the magazine 100. During the rotational movement, the spring 104 pushes the attachment member 20 in the direction of the cutting device 200.

Once the position of the abutment portion 212 on the projection 12 of the cutting blade 10 has been detected or determined and the intended tightening torque has been achieved, the cutting device 200 may be removed from the magazine 100. The cutting device 200 is thereby guided along the axial direction A until the cutting blade is located outside the region of the magazine 100.

The cutting device 200 equipped with the cutting blade 10 in such a manner can subsequently perform ultrasonic machining on a material provided on a support, for example it can separate a material or introduce a region of weakness into said material.

A worn-out blade 10 can be disposed of at a later time in another station (not shown). In the course thereof, the magazine 100 can be equipped with a new blade.

The invention claimed is:

1. A magazine for accommodating at least one cutting blade for an ultrasonic cutting device, the cutting blade being attachable to the cutting device by an attachment member, the magazine comprising:
   one or more cutting blades;
      a cutting blade support configured to receive the attachment member for the cutting blade in the magazine, and
      a first drive member which is accommodated at the magazine, the first drive member configured to rotate the attachment member received in the cutting blade support and effect attachment of the attachment member to the ultrasonic cutting device,
   wherein the first drive member is configured to perform the rotational movement of the attachment member until the cutting blade is attached to the cutting device in a defined orientation so that a longitudinal edge of the cutting blade is oriented in the defined orientation.

2. The magazine according to claim 1, further comprising a spring in contact with the cutting blade support.

3. The magazine according to claim 1, wherein the cutting blade support comprises an inner blade support component and an outer blade support component movable relative to one another, the inner blade support component configured to receive the cutting blade and being located at least partially within the outer blade support component, a spring engaging with the inner blade support component to move the inner blade support component of the cutting blade support in an axial direction.

4. The magazine according to claim 1, wherein the first drive member is a toothed wheel.

5. The magazine according to claim 1, further comprising a second drive member and a shaft which are connected to one another, wherein the first drive member is attached to the shaft with the shaft extending in a direction parallel to an axial direction.

6. The magazine according to claim 1, further comprising a counter bearing arranged in such a manner that the attachment member is accommodated between the counter bearing and the first drive member.

* * * * *